Oct. 16, 1951  J. D. KENNELLY  2,571,895
WARNING LIGHT APPARATUS
Filed March 18, 1948  3 Sheets-Sheet 1

Inventor:
Jeremiah D. Kennelly,
By Dawson, Ooms, Booth & Spangenberg,
Attorneys.

Oct. 16, 1951  J. D. KENNELLY  2,571,895
WARNING LIGHT APPARATUS
Filed March 18, 1948  3 Sheets-Sheet 3

Inventor:
Jeremiah D. Kennelly,
By Dawson, Ooms, Booth and Spangenburg,
Attorneys.

Patented Oct. 16, 1951

2,571,895

UNITED STATES PATENT OFFICE 2,571,895

WARNING LIGHT APPARATUS

Jeremiah D. Kennelly, Oak Park, Ill.

Application March 18, 1948, Serial No. 15,587

2 Claims. (Cl. 177—329)

This invention relates to a warning light apparatus. The invention is particularly useful as providing warning light rays for a locomotive, train, airplane, vessel, emergency vehicle, or other moving vehicle.

An object of the invention is to provide a structure of novel compact arrangement in which a light source is rotated alternately in opposite directions while the carriage is moved back and forth. A still further object is to provide a sector and gear structure for rotating a light source alternately in opposite directions while at the same time providing means for moving a light source bodily in different directions. A further object is to provide extremely simple means (ratchet or sector-like in character) for rotating a light source while providing means for supporting the light source offcenter with respect to its rotating shaft. Other specific objects and advantages will appear as the specification proceeds.

The invention is illustrated, in a single embodiment, by the accompanying drawings, in which—

Figure 1:
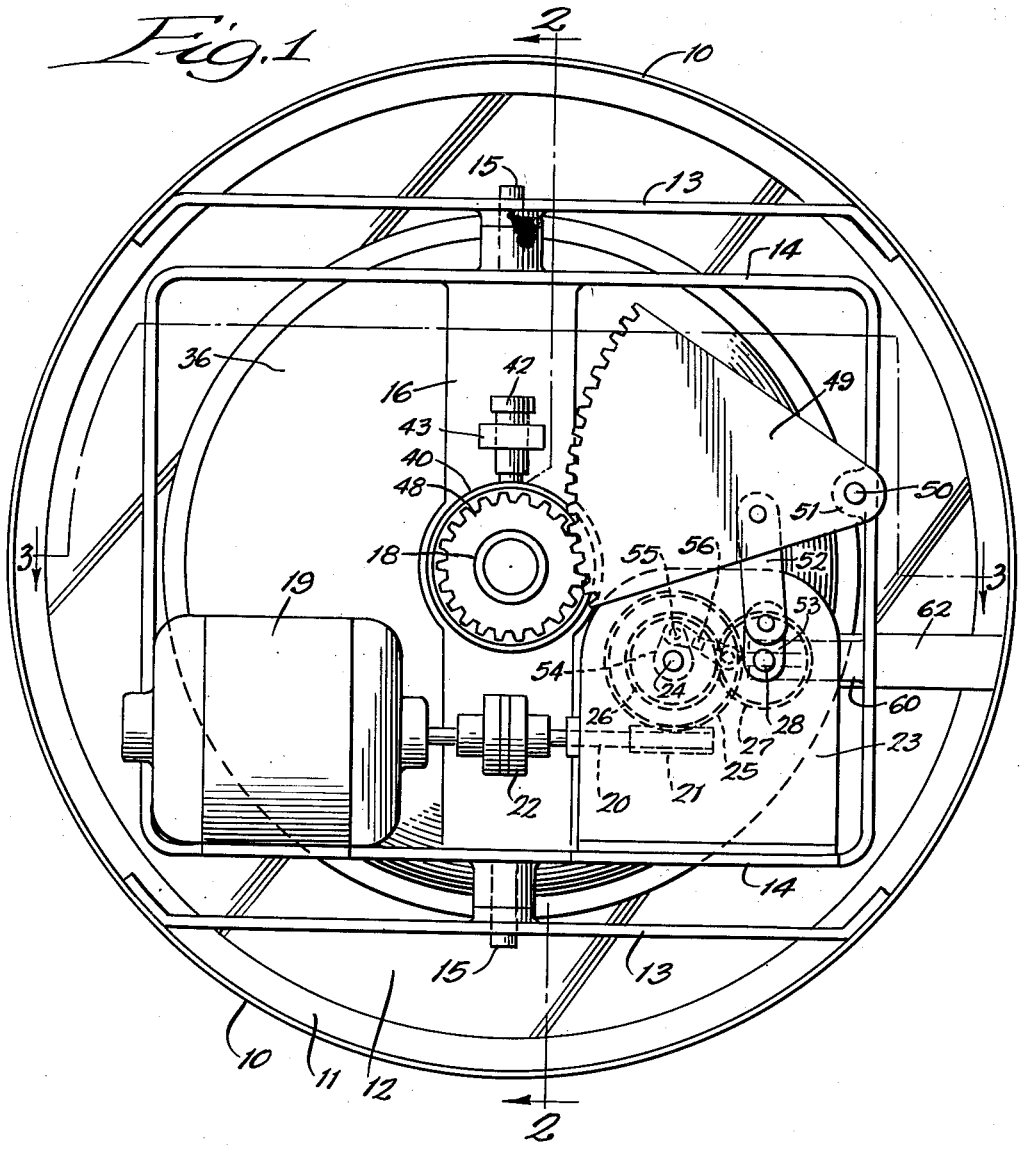
Figure 2:
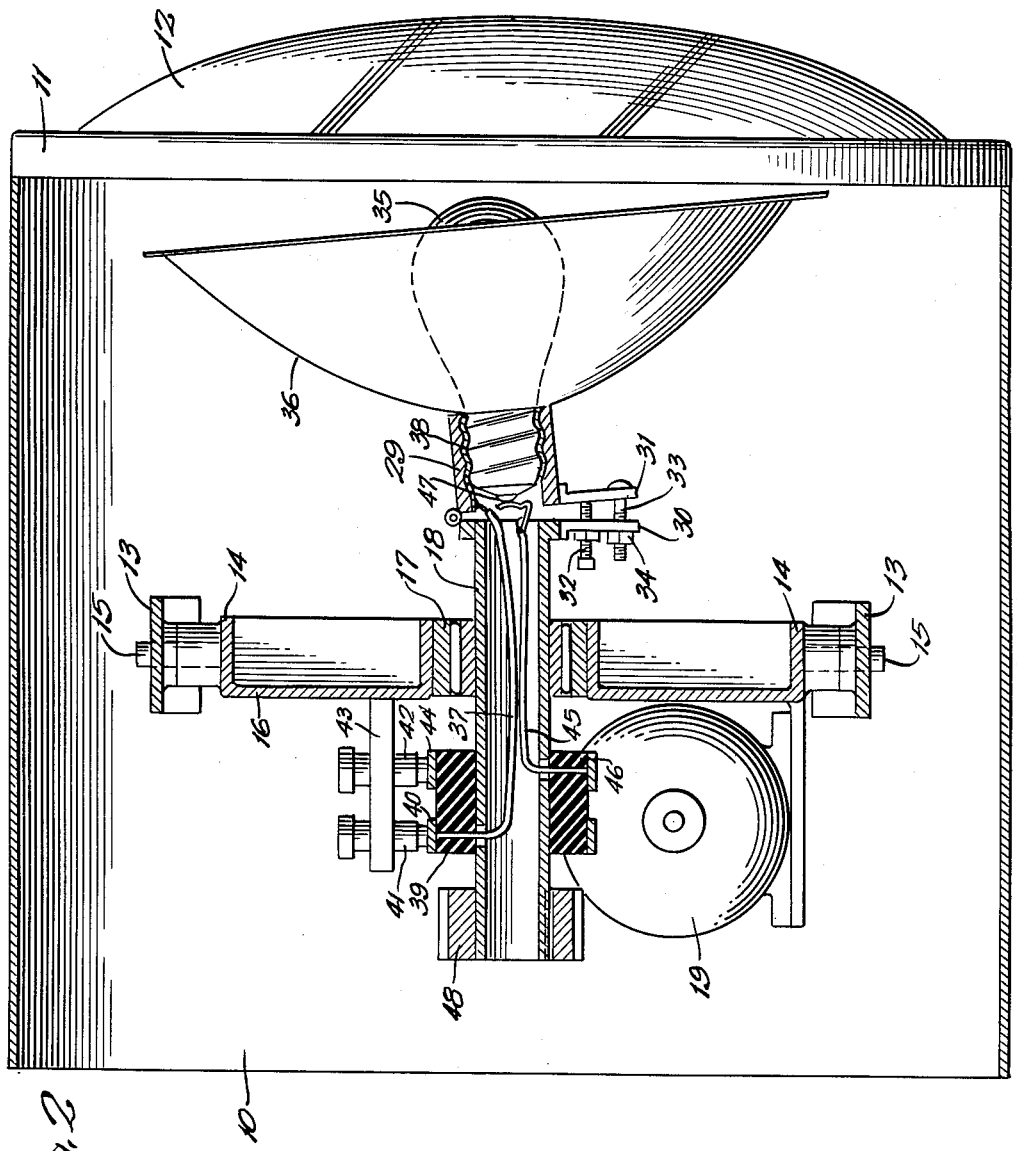
Figure 3:
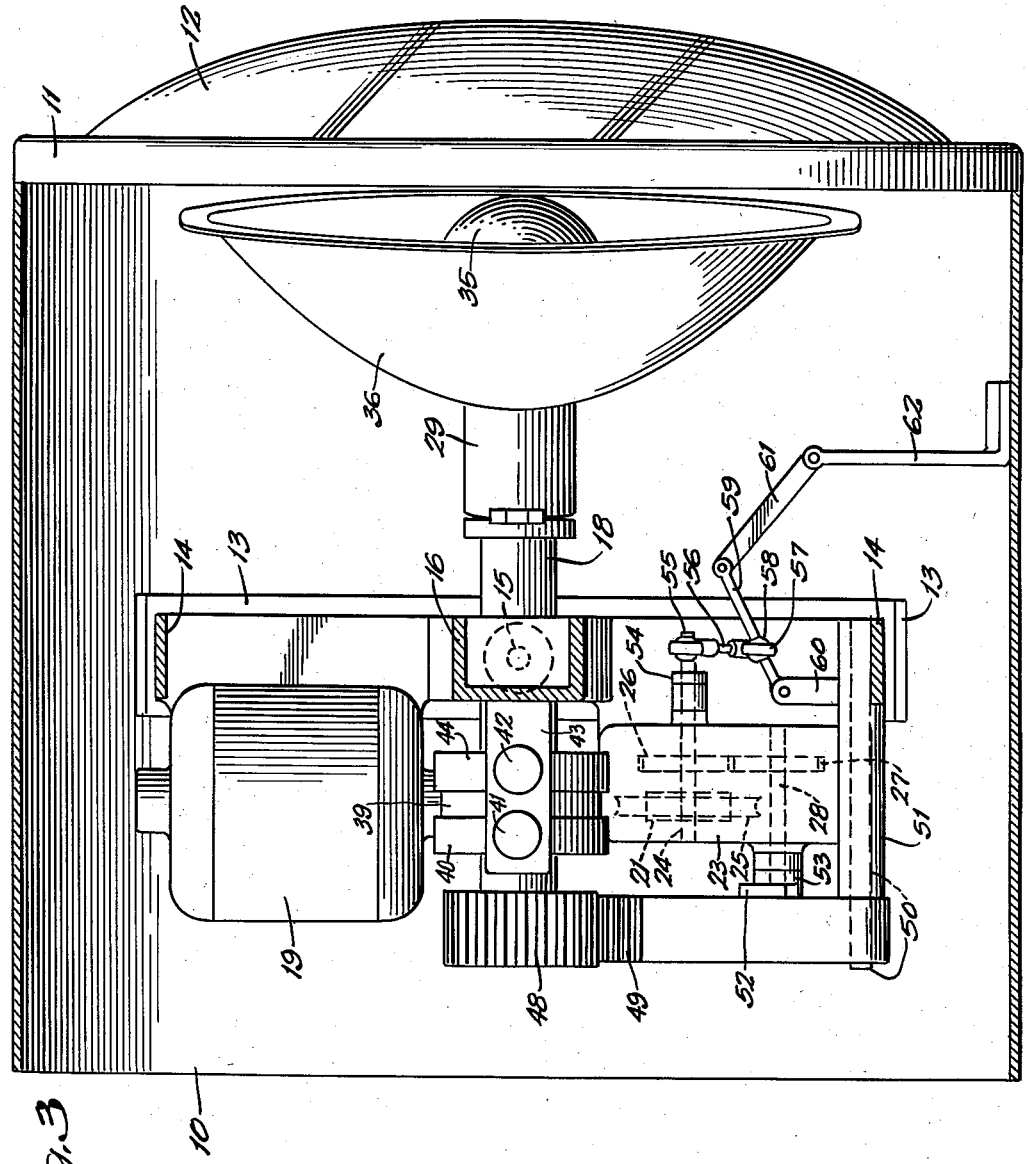

Figure 1 is a rear view in elevation of apparatus embodying my invention; Fig. 2, a vertical sectional view, the section being taken as indicated at line 2—2 of Fig. 1; and Fig. 3, a horizontal sectional view, the section being taken as indicated at line 3—3 of Fig. 1.

In the illustration given, 10 designates an outer casing equipped at its forward end with a ring frame 11 supporting lens 12. Within the frame are two spaced beams 13 which extend across the opposite end portions of the casing, as shown more clearly in Figs. 1 and 2.

Pivotally supported upon the cross beams 13 is an inner frame or carriage 14. The carriage or frame 14 is provided at opposite ends with pins 15 which extend through bearings in the beams 13 to provide pivotal support for the frame 14. The frame 14 is provided with a U-shaped plate or channel 16 centrally apertured to receive the bearings 17 for a hollow shaft 18.

Mounted upon the carriage or frame 14 is a motor 19 having its shaft 20 provided with a worm 21. If desired, the motor shaft may be equipped with a flexible coupling 22, as shown more clearly in Fig. 1.

The worm 21 extends into a reduction speed gear box 23. In the box 23 is mounted a shaft 24 equipped with a gear 25 meshing with the worm 21. As shown more clearly in Fig. 3, the shaft 24 is provided with a spur gear 26 meshing with a similar spur gear 27 mounted on a second shaft 28 in gear box 23. The shaft 28 is employed for rotating the hollow shaft 18, as will be hereinafter described, while shaft 24 is employed for moving the carriage 14 about its pivot pins 15, as will be later described.

The hollow shaft 18 is hingedly connected at its outer end to an electric light socket 29, as shown more clearly in Fig. 2. Connected to the shaft 18 is a bracket 30, and connected to the socket 29 is a bracket 31. An adjustment bolt 32 threadedly engages the bracket 30 and abuts the flange 31 so as to urge the flange or bracket 31 away from the bracket 30. A second bolt 33 extends through the brackets 31 and 30 and is equipped with a nut 34 which limits the movement of the bracket 31 away from bracket 30. Thus by means of the two bolts 32 and 33, the flanges 30 and 31 may be spaced apart at any desired angle. It will be understood that any suitable means for adjusting the position of the hub 29 laterally of the center of the hollow shaft 18 may be employed and the specific means set out is merely illustrative.

The socket 29 is provided with an electric light bulb 35, and a reflector 36 is preferably provided and supported upon the socket. Any suitable means for supplying current to the light bulb may be provided. In the specific illustration given, a lead 37 extends from the socket conductor liner 38 through an insulating block 39 carried by shaft 18 to the ring 40. Current is supplied to the ring 40 through the brush 41. Similarly, current is supplied through the brush 42 carried by the fixed support 43 to the collector ring 44 which, in turn, is connected to the lead 45 extending through the insulating block 46. The lead 45 engages the central contact 47 of the light bulb.

Fixed to the rear end of the shaft 18 is a gear 48. The gear 48 is driven by a sector arm 49 apertured to receive the pivot pin 50 and supported in the frame sleeve 51 carried by the inner frame 14. The sector arm 49 is connected by a link 52, as shown more clearly in Fig. 1, to an eccentric arm 53 fixed upon the driven shaft 28.

Any suitable means may be provided for swinging the inner frame or carriage 14 back and forth upon the pins 15. In the specific illustration given, the shaft 24 has fixed thereto an eccentric arm 54, and the eccentric arm 54 carries a pin 55 fixed to a link 56. The link 56 is connected by a ring 57 to a ball 58 mounted upon the lever 59. The lever 59 is pivoted at one end to an abutment 60 secured to the frame 14, and at its other end is pivotally connected to a link 61. The link 61 is pivotally connected at its outer end with a fixed arm 62 secured to the outer casing 10.

Operation

In the operation of the apparatus, the light bulb socket 29 is adjusted upon the shaft 18 so that the bulb is supported offcenter with respect to the shaft and laterally of the center of the shaft whereby upon rotation of the shaft the light source is caused to move in a circular direction. The light bulb may be, if desired, mounted concentrically with the shaft, but I prefer the eccentric relation which causes the light source to move in a circular path. The motor 19, when set into operation, drives through the worm 21, the worm gear 25, and thereby the shaft 24. Shaft 24 rotates the eccentric arm 54 and thereby produces an oscillation of the inner frame 14 about the pivot pins 15 carried in the frame members 13.

At the same time, the spur gear 26 on shaft 24 drives the spur gear 27 on shaft 28, and shaft 28 by means of the eccentric arm 53 moves the link 52 back and forth and thereby causes the sector arm 49 to pivot back and forth upon the pivot bracket 51. The sector 49 which meshes with gear 48 thus produces an oscillation of the shaft 18, causing it to rotate first in one direction and then in another. Thus, as the entire carriage is being moved back and forth, the hollow shaft 18 is being rotated back and forth so as to produce a pattern of light combining the composite rotary movement of the bulb and the lateral movement of the carriage. These movements may be varied as desired by changing the relative proportions of the gears, sectors, angle of the light bulb socket, etc. The speed of oscillation of the carriage may be varied by changing the relative proportions of the parts.

I find that the movement of the light source in a back-and-forth rotary direction, in combination with the oscillation of the supporting frame, gives an unusual effect as a warning device. The reversal in rotation of the light produces a sharp contrast to the regular back-and-forth sweep of the carriage and the resulting effect is to capture immediately the attention of bystanders. At the same time, the structure employed is extremely simple and effective for producing these results.

While in the foregoing specification, I have set forth one structure in considerable detail for the purpose of illustrating one embodiment of the invention, it will be understood that such details of structure may be varied widely by those skilled in the art without departing from the spirit of my invention.

I claim:

1. In warning light apparatus, a casing, an inner frame pivotally mounted upon said casing, a motor carried by said inner frame, a pair of rotatably-mounted shafts driven by said motor, a rotatably-mounted light-supporting shaft, means comprising a sector gear and a crank connecting said last-mentioned shaft to one of said first-mentioned shafts for rotating said last-mentioned shaft first in one direction and then in another, a lamp mounted on the end of said last-mentioned shaft, a reflector for said lamp carried by said shaft, said reflector being disposed with its axis at an angle to the axis of rotation of said shaft, and eccentric means connecting the second of said first-mentioned shafts with said casing for oscillating said inner frame within said casing.

2. An apparatus according to claim 1 wherein mechanical linkage is provided between said reflector and said shaft for adjusting within predetermined limits the angle between the shaft axis and the reflector axis.

JEREMIAH D. KENNELLY.

REFERENCES CITED

The following references are of record in the file of this patent:

UNITED STATES PATENTS

| Number | Name | Date |
|---|---|---|
| 1,548,958 | Sperry | Aug. 1, 1925 |
| 1,792,250 | Signor | Feb. 10, 1931 |
| 2,409,046 | Kennelly | Oct. 8, 1945 |
| 2,417,934 | Kennelly | Mar. 25, 1947 |
| 2,446,333 | Kennelly | Aug. 3, 1948 |